(12) United States Patent
Fox et al.

(10) Patent No.: US 11,092,338 B2
(45) Date of Patent: Aug. 17, 2021

(54) METHOD FOR CONSTRUCTING IMPINGEMENT/EFFUSION COOLING FEATURES IN A COMPONENT OF A COMBUSTION TURBINE ENGINE

(71) Applicant: Siemens Aktiengesellschaft, Munich (DE)

(72) Inventors: Timothy A. Fox, Simcoe (CA); Kurtis Dickerson, Hickory, NC (US); Alexander Hyatt, Fort Mill, SC (US)

(73) Assignee: Siemens Energy Global GmbH & Co. KG, Munich (DE)

( * ) Notice: Subject to any disclaimer, the term of this patent is extended or adjusted under 35 U.S.C. 154(b) by 112 days.

(21) Appl. No.: 16/609,336

(22) PCT Filed: Jun. 28, 2018

(86) PCT No.: PCT/US2018/039911
§ 371 (c)(1),
(2) Date: Oct. 29, 2019

(87) PCT Pub. No.: WO2019/006067
PCT Pub. Date: Jan. 3, 2019

(65) Prior Publication Data
US 2020/0063962 A1    Feb. 27, 2020

Related U.S. Application Data

(60) Provisional application No. 62/526,565, filed on Jun. 29, 2017.

(51) Int. Cl.
*F23R 3/00* (2006.01)
*F01D 9/02* (2006.01)

(52) U.S. Cl.
CPC .............. *F23R 3/002* (2013.01); *F01D 9/023* (2013.01); *B23P 2700/06* (2013.01);
(Continued)

(58) Field of Classification Search
CPC ............ F23R 3/002; F23R 2900/00018; F23R 2900/03044; F01D 9/023; B23P 2700/06;
(Continued)

(56) References Cited

U.S. PATENT DOCUMENTS

| 5,498,133 A | 3/1996 | Lee |
| 7,219,498 B2 | 5/2007 | Hadder |

(Continued)

FOREIGN PATENT DOCUMENTS

WO    2017023328 A1    2/2017

OTHER PUBLICATIONS

PCT International Search Report and Written Opinion of International Searching Authority dated Sep. 18, 2018 corresponding to PCT International Application No. PCT/US2018/039911 filed Jun. 28, 2018.

*Primary Examiner* — Arun Goyal
*Assistant Examiner* — Henry Ng

(57) ABSTRACT

Method for constructing impingement/effusion cooling features in a component of a combustion turbine engine is provided. A pocket 102 may be arranged between an outer wall 104 and an inner wall 106 of the component. A lasing device 108 allows drilling through the component to form an effusion hole 110. The lasing device further allows welding closed an opening 117 formed at outer wall 104 of the component during the drilling with the lasing device through the component. Lasing device 108 further allows drilling through outer wall 104 of the component to form an impingement hole 118 for the impingement/effusion cooling feature. The proposed methodology in a multi-panel arrangement, for example, eliminates a need of having to pre-drill such holes in individual panels prior to the bonding and forming of the component, which overcomes various drawbacks commonly associated with such pre-drilling.

13 Claims, 3 Drawing Sheets

(52) U.S. Cl.
CPC ...... *B23P 2700/13* (2013.01); *F05D 2230/13* (2013.01); *F05D 2260/201* (2013.01); *F23R 2900/00018* (2013.01); *F23R 2900/03044* (2013.01)

(58) Field of Classification Search
CPC ............. B23P 2700/13; F05D 2230/13; F05D 2260/201; Y10T 29/4932; Y10T 29/49346; Y10T 29/49348; B23K 26/50; B23K 26/53; B23K 26/55; B23K 26/57; B23K 26/0093; B23K 26/38; B23K 26/382; B23K 26/384; B23K 26/386; B23K 26/389
See application file for complete search history.

(56) References Cited

U.S. PATENT DOCUMENTS

| | | | |
|---|---|---|---|
| 7,625,180 B1* | 12/2009 | Liang | F01D 5/186 29/889.2 |
| 2004/0169022 A1* | 9/2004 | Mega | F02C 3/30 219/121.64 |
| 2006/0016191 A1 | 1/2006 | Woodcock et al. | |
| 2010/0154214 A1* | 6/2010 | Hsu | B23K 9/0026 29/889.21 |
| 2010/0272953 A1* | 10/2010 | Yankowich | F23R 3/06 428/138 |
| 2011/0024393 A1* | 2/2011 | Cui | B23K 35/3066 219/76.1 |
| 2012/0034075 A1* | 2/2012 | Hsu | F23R 3/005 415/178 |
| 2012/0156020 A1* | 6/2012 | Kottilingam | B23K 35/3033 415/200 |
| 2015/0226433 A1* | 8/2015 | Dudebout | F23R 3/16 60/752 |
| 2016/0069567 A1 | 3/2016 | Burd | |
| 2016/0069569 A1* | 3/2016 | Burd | F23R 3/06 60/806 |
| 2016/0109130 A1* | 4/2016 | Stastny | B23K 26/342 60/755 |
| 2016/0131364 A1* | 5/2016 | Burd | F23R 3/06 60/752 |
| 2016/0238248 A1* | 8/2016 | Roberge | F23R 3/007 |
| 2020/0132304 A1* | 4/2020 | Dudebout | F23R 3/002 |

* cited by examiner

METHOD FOR CONSTRUCTING IMPINGEMENT/EFFUSION COOLING FEATURES IN A COMPONENT OF A COMBUSTION TURBINE ENGINE

BACKGROUND

1. Field

Disclosed embodiments are generally related to combustion turbine engines, such as gas turbine engines and, more particularly, to method for constructing impingement/effusion cooling features in components of a combustion turbine engine.

2. Description of the Related Art

Typically, gas turbine engines include a compressor for compressing air, a combustor for mixing the compressed air with fuel and igniting the mixture, and a turbine section for producing power. Combustors often operate at substantially high temperatures. Accordingly, components, such as transition ducts and other components in the turbine engine should be appropriately cooled.

See, for example, patent application PCT/US2015/043966, titled "Component Having Impingement Cooled Pockets Formed by Raised Ribs and a Cover Sheet Diffusion Bonded to the Raised Ribs"; and patent application PCT/US2016/043809 titled "Cooling Features for a Gas Turbine Engine", for non-limiting examples of impingement/effusion cooling features that may be used in components of a gas turbine engine.

DETAILED DESCRIPTION

Figure 1:
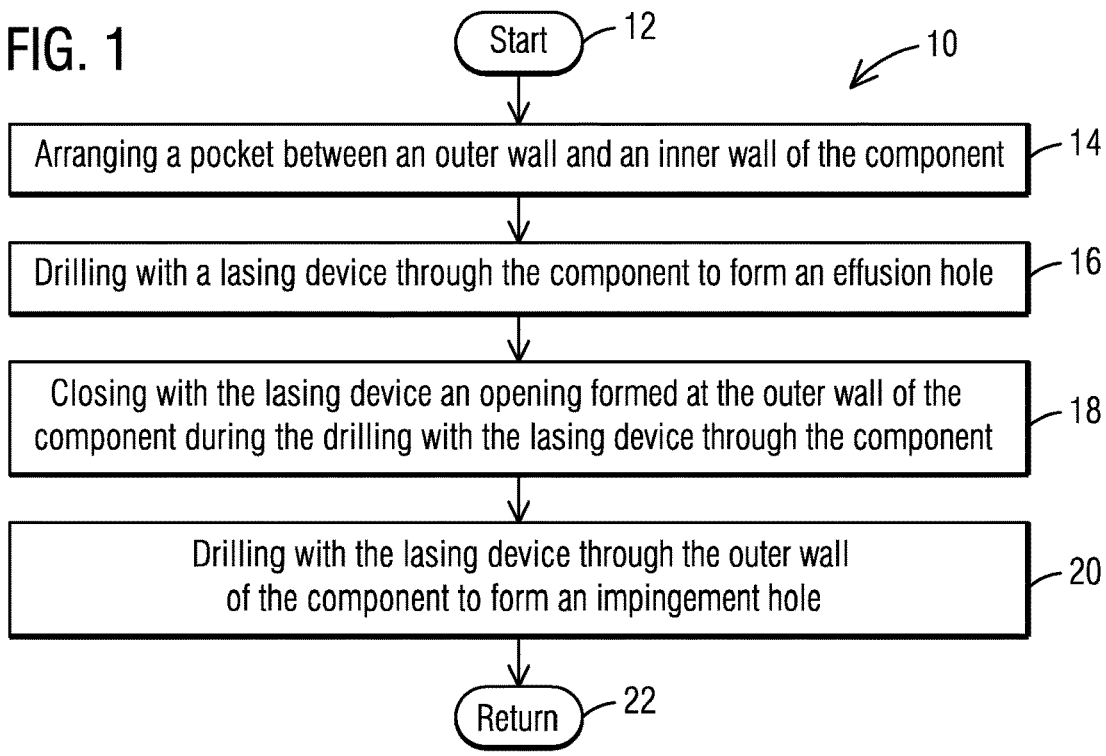
FIG. 1 is a flow chart of a disclosed method for constructing impingement/effusion cooling features in a component of a combustion turbine engine.

The inventors of the present invention have recognized certain issues that can arise in the context of constructing impingement/effusion cooling features in components of a combustion turbine engine. The cooling features may involve impingement and effusion holes that without limitation may be constructed between two or more panels (e.g., a multi-panel arrangement) that may be bonded (e.g., diffusion bonding) or otherwise affixed to one another to form the body of the component, such as transition ducts, ring segments, combustor liners, etc. While bonded panel technology may be discussed herein, it should be understood that other techniques may be employed for affixing the panels, such as without limitation, casting, welding and brazing.

In certain known techniques for constructing the impingement/effusion cooling features, the holes involved in the cooling features are generally drilled in individual panels prior to the bonding and forming of the component. That is, there may be drilling operations involved prior to the bonding and forming of the component. As a result of such drilling operations prior to the bonding and forming of the component, at least the following issues can arise. For example, hole geometry may distort from one panel to another panel during the hole-drilling operations. Similarly, hole positioning may shift from one panel to another panel during the hole-drilling operations.

Another issue that can arise is that such holes may need to be masked during a coating operation, such as when applying a thermal barrier coating to a surface of the component that may be subject to a hot-flow of combustion gases. This masking operation can be substantially burdensome and costly, as the holes may not be straight through, and may not be readily masked. As will be appreciated by those skilled in the art, pin or polymer masking is generally substantially labor intensive. For example, in certain components there may be several thousand holes that may involve masking, and thus this masking can quickly become prohibitively costly. It will be appreciated that during servicing of a given component, stripping and recoating operations may be involved, and in this case, once again the holes would have to be masked during the recoating operation, which as noted above can be substantially burdensome and costly.

In view of such a recognition, the present inventors propose an innovative methodology for constructing impingement/effusion cooling features in a component of a combustion turbine engine, where the proposed methodology in a cost-effective and reliable manner successfully overcomes the foregoing issues. In one non-limiting embodiment, the proposed methodology can make use of a single lasing device to construct highly efficient and low-flow impingement/effusion cooling features. The single lasing device may be configured by appropriately setting in a controller of the lasing device applicable lasing parameters for performing a desired laser operation, such as laser drilling and welding, to construct the impingement/effusion cooling features in components of the combustion turbine engine without having to perform drilling operations on the panels prior to affixing such panels to one another and thus overcoming the foregoing issues.

In the following detailed description, various specific details are set forth in order to provide a thorough understanding of such embodiments. However, those skilled in the art will understand that embodiments of the present invention may be practiced without these specific details, that the present invention is not limited to the depicted embodiments, and that the present invention may be practiced in a variety of alternative embodiments. In other instances, methods, procedures, and components, which would be well-understood by one skilled in the art have not been described in detail to avoid unnecessary and burdensome explanation.

Furthermore, various operations may be described as multiple discrete steps performed in a manner that is helpful for understanding embodiments of the present invention. However, the order of description should not be construed as to imply that these operations need be performed in the order they are presented, nor that they are even order dependent, unless otherwise indicated. Moreover, repeated usage of the phrase "in one embodiment" does not necessarily refer to the same embodiment, although it may. It is noted that disclosed embodiments need not be construed as mutually exclusive embodiments, since aspects of such disclosed embodiments may be appropriately combined by one skilled in the art depending on the needs of a given application.

The terms "comprising", "including", "having", and the like, as used in the present application, are intended to be synonymous unless otherwise indicated. Lastly, as used herein, the phrases "configured to" or "arranged to" embrace the concept that the feature preceding the phrases "configured to" or "arranged to" is intentionally and specifically designed or made to act or function in a specific way and should not be construed to mean that the feature just has a capability or suitability to act or function in the specified way, unless so indicated.

Figure 2:
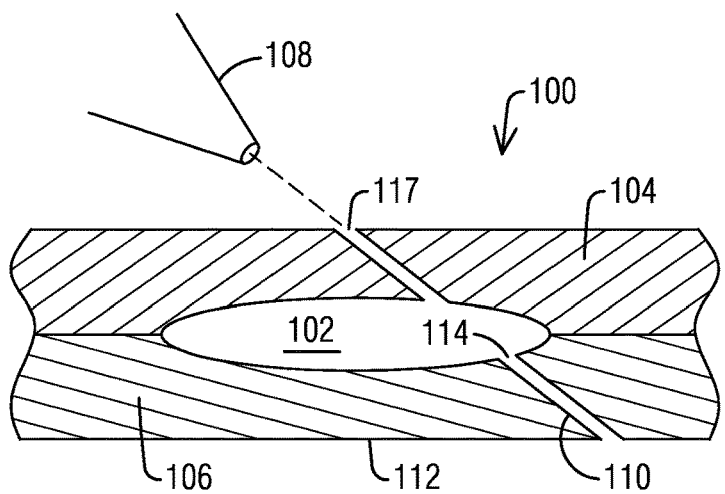
FIGS. 2-4 show a flow sequence in connection with a component that may benefit from the disclosed method for constructing the impingement/effusion cooling features.
Figure 3:
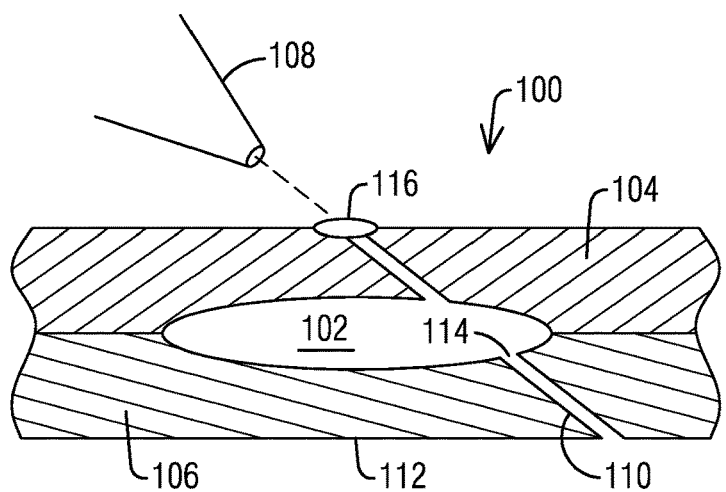
Figure 4:
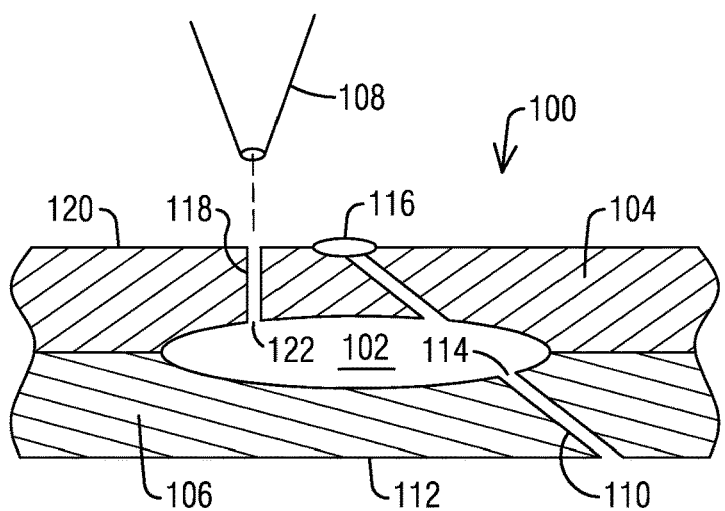

FIG. 1 is a flow chart 10 of a disclosed method for constructing impingement/effusion cooling features in a component of a combustion turbine engine. A section, fragmentary view of a component 100 that may benefit from the disclosed method is shown in FIGS. 2-4 that collectively illustrate a flow sequence in connection with the disclosed method for constructing the impingement/effusion cooling features. The description below makes reference both to the flow chart and to the flow sequence and to facilitate the reader tracking the reference numerals in such figures, it is noted that the reference numerals in the flow chart start with the number 10 while the reference numbers in the flow sequence start with the number 100.

In one non-limiting embodiment, subsequent to a start step 12, step 14 allows arranging a pocket 102 between an outer wall 104 and an inner wall 106 of the component (for example walls 104,106 may respectively comprise the cold side and the hot side of the component). Step 16 allows drilling with a lasing device 108 through the component to form an effusion hole 110 for the impingement/effusion cooling feature. Effusion hole 110 may be slanted relative to a surface 112 of the inner wall of the component and in flow communication with pocket 102 in the component via a pocket exit opening 114. It will be appreciated that the configuration of pocket 102, and effusion hole 110, as illustrated in the drawings, should be construed in an example sense and not in a limiting sense since such configurations could be tailored based on the needs of a given application. Without limitation, pocket 102 could be construed as an elongated channel with one or more inlets (i.e., impingement holes) and one or more outlets (i.e., effusion holes). Accordingly, the number of holes and pocket configuration illustrated in the drawings should be construed in an example sense and not in a limiting sense.

In one non-limiting embodiment, a thermal barrier coating may be optionally disposed on the surface of the inner wall prior to drilling step 16 with the lasing device through the component. In this case, drilling step 116 would allow drilling through the thermal barrier coating disposed on the surface of the inner wall of the component.

In one non-limiting embodiment, the component may be optionally formed by an arrangement of diffusion bonded panels, and in this case drilling step 16 would allow drilling through the arrangement of diffusion bonded panels. The arrangement of diffusion bonded panels may comprise an intermediate panel disposed between an inner panel that constitutes the inner wall of the component and an outer panel that constitutes the outer wall of the component. Pocket 102 would be arranged in the intermediate panel, effusion hole 110 would be formed in the inner panel and impingement hole 118 would be formed in the outer panel.

Step 18 allows closing (schematically represented by ellipse 116 in FIGS. 3-4) with lasing device 108 an opening 117 (FIG. 2) formed at outer wall 104 of the component during the drilling with the lasing device through the component. In one non-limiting embodiment, closing step 18 may comprise welding opening 117 formed at the outer wall of the component during the drilling with the lasing device through the component.

Prior to return step 22, step 20 allows drilling with lasing device 108 through outer wall 104 of the component to form an impingement hole 118 (FIG. 4) for the impingement/effusion cooling feature. Impingement hole 118 may be perpendicular relative to a surface 120 of outer wall 104 of the component and in flow communication with the pocket in the component via a pocket entry opening 122.

Figure 5:
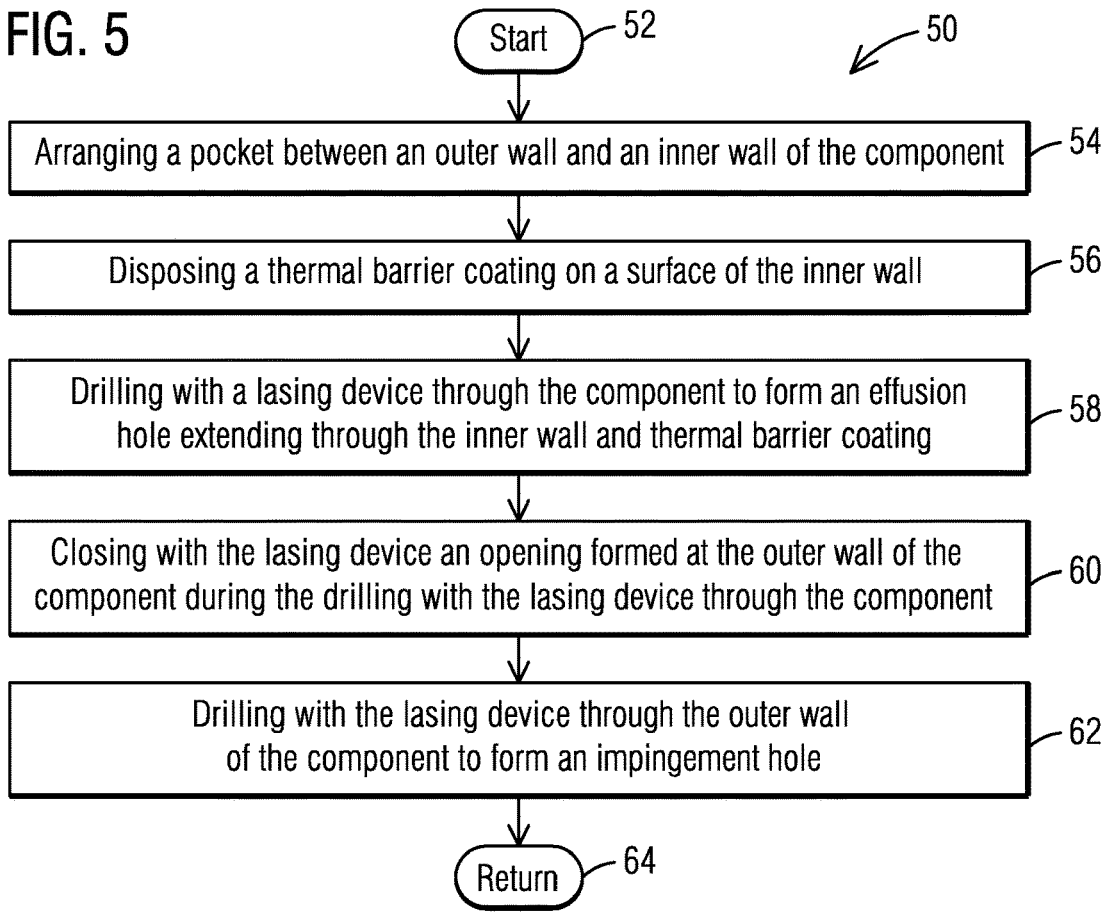
FIG. 5 is a flow chart of a variant of the disclosed method for constructing impingement/effusion cooling features in a component of a combustion turbine engine, where, for example, the component may comprise a multi-panel arrangement.
Figure 6:
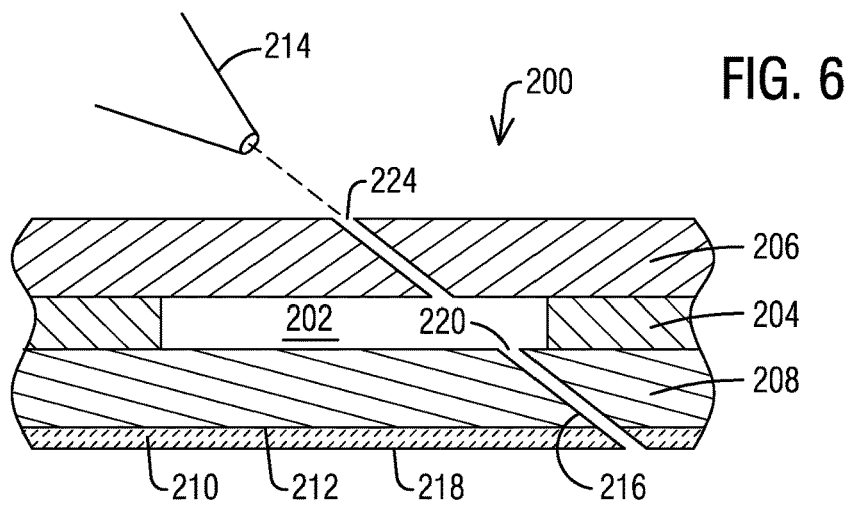
FIGS. 6-8 show a flow sequence in connection with a multi-panel arrangement that may benefit from the disclosed method for constructing the impingement/effusion cooling features.
Figure 7:
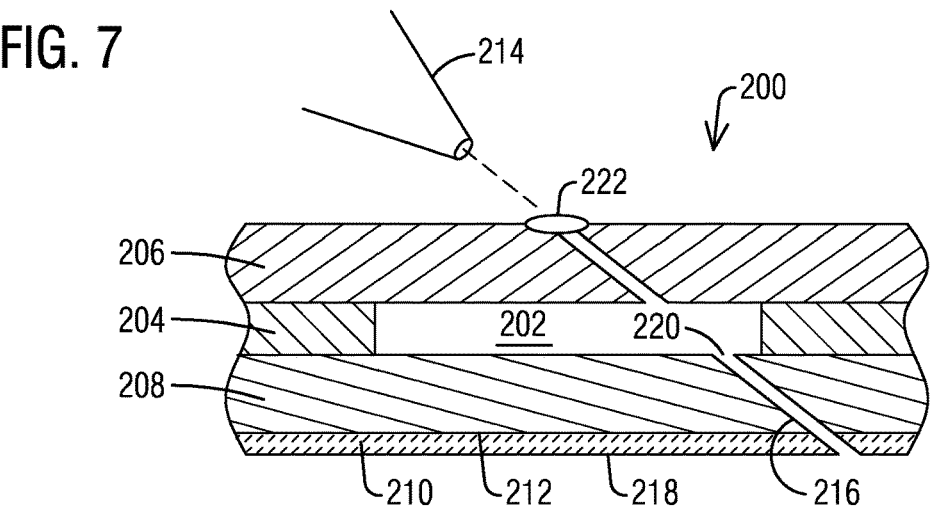
Figure 8:
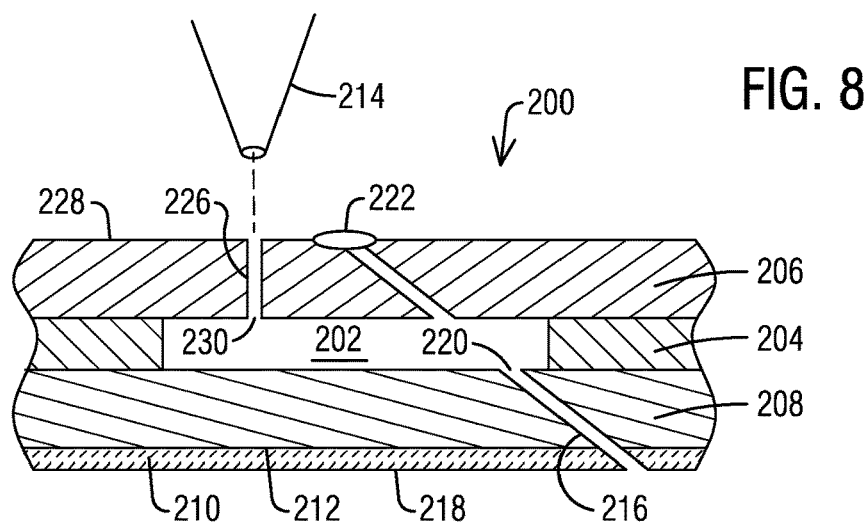

FIG. 5 is a flow chart 50 of another disclosed method for constructing impingement/effusion cooling features in a component of a combustion turbine engine such as may comprise a multi-panel arrangement including a thermal barrier coating at a hot side of the component. A sectional fragmentary view of a component 200 that may benefit from the disclosed method is shown in FIGS. 6-8 that collectively illustrate a flow sequence in connection with the disclosed method for constructing the impingement/effusion cooling features. The description below makes reference both to the flow chart and to the flow sequence and to facilitate the reader tracking reference numerals in such figures, it is noted that the reference numerals in the flow chart start with the number 50 while the reference numbers in the flow sequence start with the number 200.

In one non-limiting embodiment, subsequent to a start step 52, step 54 allows arranging a pocket 202 disposed in an intermediate panel 204 as may be disposed between an outer panel 206 and an inner panel 208 of component 200 (for example panels 206, 208 may respectively comprise the cold side and the hot side of the component). Without limitation, step 56 allows disposing a thermal barrier coating 210 on a surface 212 of inner panel 208 of component 200.

Step 58 allows drilling with a lasing device 214 through the component to form an effusion hole 216 for the impingement/effusion cooling feature. Effusion hole 216 may extend through inner panel 208 and thermal barrier coating 210. Effusion hole 216 may be slanted relative to a surface 218 of thermal barrier coating 210 and may be in flow communication with pocket 202 in the component via a pocket exit opening 220. In one non-limiting embodiment, an affixing of panels 204, 206, 208 may be performed prior to drilling step 58.

In one non-limiting embodiment, the affixing of panels 204, 206, 208 to one another may comprise diffusion bonding of the panels. Since the disposing of thermal barrier coating on surface 212 of inner panel 208 is performed prior to drilling step 58, this avoids a masking of holes that otherwise would be present on surface 212 of inner panel 208.

Step 60 allows closing (schematically represented by ellipse 222 in FIGS. 7-8) with the lasing device an opening 224 (FIG. 6) formed at outer panel 206 of the component during the drilling with the lasing device through the component. In one non-limiting embodiment, closing step 60 comprises welding opening 224 formed at the outer wall of the component during the drilling with the lasing device through the component.

Prior to return step 64, step 62 allows drilling with lasing device 214 through outer panel 206 of the component to form an impingement hole 226 (FIG. 8) for the impingement/effusion cooling feature. Impingement hole 226 may be perpendicular relative to a surface 228 of outer panel 206 of the component and in flow communication with pocket 202 in the component via a pocket entry opening 230.

In operation, the proposed methodology, for example, would allow performing an application of a thermal barrier coating without having to mask potentially thousands of pre-drilled holes disposed at the hot side of the component. Servicing operations can make use of the proposed methodology to strip and recoat a component without considering previous hole locations. Additionally, bonding quality for joining such panels may be improved since such holes would not be present prior to the bonding and forming of the component. Lastly, cooling air savings, compared to a conventional cast design or a channel cooled bonded design, are estimated to improve by approximately 2-3% G1C depending on firing temperatures and coating characteristics. This is conducive to significant efficiency benefits for the engine.

While embodiments of the present disclosure have been disclosed in exemplary forms, it will be apparent to those skilled in the art that many modifications, additions, and deletions can be made therein without departing from the scope of the invention and its equivalents, as set forth in the following claims.

What is claimed is:

1. A method for constructing impingement/effusion cooling features in a component of a combustion turbine engine, the method comprising:
    arranging a pocket between an outer panel and an inner panel of the component, wherein either
        the outer panel and the inner panel are diffusion bonded together to form the component, or
        the outer panel and the inner panel are diffusion bonded to an intermediate panel in-between the outer panel and the inner panel to form the component;
    drilling with a lasing device through the component to form an effusion hole for the impingement/effusion cooling features, the effusion hole being slanted relative to a surface of the inner panel of the component and in flow communication with the pocket in the component via a pocket exit opening;
    closing with the lasing device an opening formed at the outer panel of the component during the drilling with the lasing device through the component; and
    drilling with the lasing device through the outer panel of the component to form an impingement hole in the impingement/effusion cooling features, the impingement hole being perpendicular relative to a surface of the outer panel of the component and in flow communication with the pocket in the component via a pocket entry opening.

2. The method of claim 1, wherein the component is formed by an arrangement of diffusion bonded panels.

3. The method of claim 2, wherein the drilling with the lasing device through the component to form the effusion hole in the impingement/effusion cooling features comprises drilling through the arrangement of diffusion bonded panels.

4. The method of claim 3, Wherein the arrangement of diffusion bonded panels comprises the intermediate panel disposed between the inner panel of the component and the outer panel of the component, wherein the pocket is arranged in the intermediate panel, wherein the effusion hole is formed in the inner panel and the impingement hole is formed in the outer panel.

5. The method of claim 4, further comprising disposing a thermal barrier coating on the surface of the inner panel prior to the drilling with the device through the component.

6. The method of claim 5, wherein the drilling with the lasing device through the component to form the effusion hole in the impingement/effusion cooling features comprises drilling through the arrangement of diffusion bonded panels and the thermal barrier coating disposed on the surface of the inner panel.

7. The method of claim 1, further comprising disposing a thermal barrier coating on the surface of the inner panel prior to the drilling with the lasing device through the component.

8. The method of claim 7, wherein the drilling with the lasing device through the component to form the effusion hole in the impingement/effusion cooling features comprises drilling through the thermal barrier coating disposed on the surface of the inner panel of the component.

9. The method of claim 1, wherein the closing with the lasing device comprises welding the opening formed at the outer panel of the component during the drilling with the lasing device through the component.

10. A transition duct comprising the component, and wherein the method comprises constructing the impingement/effusion cooling features in said transition duct in accordance with the method of claim 1.

11. A method for constructing impingement/effusion cooling features in a component of a combustion turbine engine, the method comprising:
    arranging a pocket between an outer panel and an inner panel of the component, wherein either
        the outer panel and the inner panel are diffusion bonded together to form the component, or
        the outer panel and the inner panel are diffusion bonded to an intermediate panel in-between the outer panel and the inner panel to form the component;
    disposing a thermal barrier coating on a surface of the inner panel of the component;
    drilling with a lasing device through the component to form an effusion hole in the impingement/effusion cooling features, the effusion hole extending through the inner panel and the thermal barrier coating, the effusion hole being slanted relative to a surface of the thermal barrier coating and in flow communication with the pocket in the component via a pocket exit opening;
    closing with the lasing device an opening formed at the outer panel of the component during the drilling with the lasing device through the component; and
    drilling with the lasing device through the outer panel of the component to form an impingement hole in the impingement/effusion cooling features, the impingement hole being perpendicular relative to a surface of the outer panel of the component and in flow communication with the pocket in the component via a pocket entry opening.

12. The method of claim 11, wherein the component is formed by an arrangement of panels affixed to one another, wherein an affixing of the panels to one another is performed prior to the drilling with the lasing device through the component.

13. The method of claim 11, wherein the disposing of the thermal barrier coating on the surface of the inner panel is performed prior to the drilling with the lasing device through the component, thereby avoiding a masking of holes that otherwise would be present on the surface of the inner panel of the component when disposing the thermal barrier coating.

* * * * *